US012592875B2

(12) United States Patent
Dang et al.

(10) Patent No.: US 12,592,875 B2
(45) Date of Patent: Mar. 31, 2026

(54) DETECTING CLOUD SERVICE LATENCY ISSUES THROUGH ANALYSIS OF TENANT LATENCY SIGNALS

(71) Applicant: MICROSOFT TECHNOLOGY LICENSING, LLC, Redmond, WA (US)

(72) Inventors: Yingnong Dang, Sammamish, WA (US); Roumil Tejas Shah, Redmond, WA (US); Yuxuan Chen, Bellevue, WA (US); Youjiang Wu, Seattle, WA (US); Zhangwei Xu, Redmond, WA (US); Nathaniel Elliott Brown, Atlanta, GA (US); Udaivir Yadav, Austin, TX (US); Piyali Jana, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 18/744,043

(22) Filed: Jun. 14, 2024

(65) Prior Publication Data
US 2025/0385853 A1      Dec. 18, 2025

(51) Int. Cl.
*H04L 43/0888* (2022.01)
*H04L 43/091* (2022.01)

(52) U.S. Cl.
CPC ........ *H04L 43/0888* (2013.01); *H04L 43/091* (2022.05)

(58) Field of Classification Search
CPC .......................... H04L 43/0888; H04L 43/091
See application file for complete search history.

(56) References Cited

U.S. PATENT DOCUMENTS 11,675,648 B2 * 6/2023 Chen ................... G06F 11/0754
                                                                714/38.1
12,124,564 B2 * 10/2024 Venkataraman ........ G06F 21/56
(Continued)

OTHER PUBLICATIONS

Grohmann et al., "MonitorlessL Predicting Performance Degradation in Cloud APplications with Machine Learning", Middleware 19: Proceedings of the 20th Internatinal Middleware Conference, Dec. 9, 2019, ACM Publishing.*
(Continued)

*Primary Examiner* — Todd L Barker
(74) *Attorney, Agent, or Firm* — Newport IP, LLC; Jacob P. Rohwer

(57) ABSTRACT

The techniques describe effective detection of latency-related issues for a cloud service operating in a distributed computing environment. To detect the latency-related issues, a system first determines baseline latency behavior at the tenant level (e.g., on a tenant-by-tenant basis) and compares a tenant's current latency behavior to the baseline latency behavior. If the comparison yields that the current latency behavior for the tenant is following the baseline latency behavior, the tenant is deemed healthy. However, if the comparison yields that the current latency behavior for the tenant is not closely following the baseline latency behavior, the tenant is deemed unhealthy. Once the system has made binary health determinations for various tenants on a tenant-by-tenant basis, the system is configured to aggregate the unhealthy determinations across a group of tenants to determine whether the cloud service is experiencing latency-related issues.

20 Claims, 10 Drawing Sheets

(56) References Cited

U.S. PATENT DOCUMENTS

| | | | | |
|---|---|---|---|---|
| 2020/0104233 A1* | 4/2020 | Gaber | ................. | G06F 11/3476 |
| 2022/0365834 A1* | 11/2022 | Chen | ................... | G06F 11/0793 |
| 2024/0103993 A1* | 3/2024 | Garg | ................... | G06F 11/3419 |

OTHER PUBLICATIONS

Gyeera et al., "Regression Analysis of Predictions and Forecasts of Cloud Data Center KPIs Using the Boosted Decision Tree Algorithm", IEEE Transactions on BIg Data, vol. 9, Issue 4, Aug. 2023, IEEE Publishing.*
Khan at al., "Macine Learning-Based Application for Predicting 5G/B5G Service", Jan. 19, 2023.*

* cited by examiner

400

| Sample Index 402 | Time Interval for Time Bin 404 | "P75" Latency Value 406 | Description 408 |
|---|---|---|---|
| 1 | 1 May 2024 - 12:00-12:05AM | 3 seconds | 75% of requests < 3 seconds<br>25% of requests > 3 seconds |
| 2 | 1 May 2024 - 12:05-12:10AM | 4 seconds | 75% of requests < 4 seconds<br>25% of requests > 4 seconds |
| 3 | 1 May 2024 - 12:10-12:15AM | 5 seconds | 75% of requests < 5 seconds<br>25% of requests > 5 seconds |
| 4 | 1 May 2024 - 12:15-12:20AM | 8 seconds | 75% of requests < 8 seconds<br>25% of requests > 8 seconds |
| 5 | 1 May 2024 - 12:20-12:25AM | 4 seconds | 75% of requests < 4 seconds<br>25% of requests > 4 seconds |
| ⋮ | ⋮ | ⋮ | ⋮ |
| 4029 | 14 May 2024 – 11:40-11:45PM | 3 seconds | 75% of requests < 3 seconds<br>25% of requests > 3 seconds |
| 4030 | 14 May 2024 – 11:45-11:50PM | 2 seconds | 75% of requests < 2 seconds<br>25% of requests > 2 seconds |
| 4031 | 14 May 2024 – 11:50-11:55PM | 10 seconds | 75% of requests < 10 seconds<br>25% of requests > 10 seconds |
| 4032 | 14 May 2024 – 11:55-12:00AM | 18 seconds | 75% of requests < 18 seconds<br>25% of requests > 18 seconds |

Baseline Distribution 132

Mean 134

Standard Deviation 136

FIG. 4A

| Percentile 504 | Score Vector 502 | Weight 506 | Output 508 |
|---|---|---|---|
| "P50" | 35.012 | 0.5 | 17.506 |
| "P75" | 42.074 | 0.3 | 12.622 |
| "P90" | 56.498 | 0.1 | 5.649 |
| "P95" | 58.248 | 0.08 | 4.659 |
| "P99" | 65.321 | 0.02 | 1.306 |

Overall Latency Health Score 510

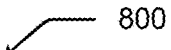

800

GENERATE A TENANT-SPECIFIC MODEL FOR A LATENCY SIGNAL BY ANALYZING A TRAINING DATASET FOR A TENANT OVER A TRAINING TIME PERIOD, WHEREIN THE TRAINING DATASET INCLUDES RESPECTIVE PERCENTILE LATENCY VALUES, PER A DEFINED TIME BIN, FOR EACH PERCENTILE IN A DEFINED SET OF PERCENTILES, THE RESPECTIVE LATENCY VALUES ARE ASSOCIATED WITH A SERVICE OFFERED BY A CLOUD PROVIDER, AND THE TENANT-SPECIFIC MODEL DEFINES A DISTRIBUTION BASED ON A MEAN AND A STANDARD DEVIATION OF THE RESPECTIVE PERCENTILE LATENCY VALUES FOR EACH PERCENTILE
802

ACCESS CURRENT PERCENTILE LATENCY VALUES ASSOCIATED WITH THE TENANT FOR A CURRENT TIME BIN
804

GENERATE A LATENCY HEALTH SCORE VECTOR FOR THE TENANT AND FOR THE CURRENT TIME BIN BY DETERMINING PERCENTILE HEALTH SCORES FOR EACH PERCENTILE VIA A COMPARISON OF A CURRENT PERCENTILE LATENCY VALUE TO THE CORRESPONDING DISTRIBUTION IN THE TENANT-SPECIFIC MODEL
806

CALCULATE AN OVERALL LATENCY HEALTH SCORE BASED ON A PLURALITY OF LATENCY HEALTH SCORES IN THE LATENCY HEALTH SCORE VECTOR
808

DETERMINE THAT THE OVERALL LATENCY HEALTH SCORE IS LESS THAN LATENCY HEALTH SCORE THRESHOLD
810

DESIGNATE THE TENANT AS AN UNHEALTHY TENANT DUE TO ABNORMAL LATENCY IN RESPONSE TO DETERMINING THAT THE OVERALL LATENCY HEALTH SCORE IS LESS THAN THE LATENCY HEALTH SCORE THRESHOLD
812

DETERMINE THAT A TOTAL NUMBER OF UNHEALTHY TENANTS FOR THE CURRENT TIME BIN IS GREATER THAN A PREDEFINED THRESHOLD NUMBER OF UNHEALTHY TENANTS
814

SEND, TO AN OWNER OF THE SERVICE AND BASED ON THE TOTAL NUMBER OF UNHEALTHY TENANTS BEING GREATER THAN THE PREDEFINED THRESHOLD NUMBER OF UNHEALTHY TENANTS, A NOTIFICATION INDICATING A POTENTIAL LATENCY ISSUE 164 ASSOCIATED WITH THE SERVICE
816

FIG. 8

DETECTING CLOUD SERVICE LATENCY ISSUES THROUGH ANALYSIS OF TENANT LATENCY SIGNALS

A cloud platform such as MICROSOFT AZURE, AMA-ZON WEB SERVICES, GOOGLE CLOUD, etc. is config-ured to provide resources for various tenants. A tenant may be a customer, a business, an organization, a client, an individual user, and so forth. The datacenters and other infrastructure that comprise the cloud platform are con-structed with a variety of different types of "cloud" resources (e.g., processing resources, storage resources, networking resources, power resources, temperature control resources) which work together to not only execute tenant services (e.g., an application), but to also execute cloud services that support and enable execution of the tenant services (e.g., a cloud service is tasked with managing orchestration and deployment via KUBERNETES).

Previous solutions for monitoring the health of a cloud service relies on various metrics, including latency, to evalu-ate the performance and/or the reliability of the cloud service with respect to tenant requests. A typical latency monitor is configured to detect spikes and/or dips in the latency metric across a number of tenants.

SUMMARY

The system disclosed herein is configured to effectively detect latency issues for a cloud service operating in a distributed computing environment. To detect the latency issues for the cloud service, the system analyzes a latency signal on a tenant-by-tenant basis. As described herein, the latency signal includes latency values for a defined set of percentiles. These latency values are referred to herein as "percentile" latency values. The latency signal is generated and/or collected with respect to a defined time bin (e.g., one minute time bins, five minute time bins, ten minute time bins, one hour time bins).

A percentile is a value at or below which a given per-centage of values falls. A percentile may be represented in the format "PX", where "X" equals a defined percentile between zero and one hundred (e.g., "X"=5%, "X"=50%, "X"=75%, "X"=99%, "X"=99.9%). A percentile is expressed in the same measurement unit at which the values are measured. With respect to latency, this measurement unit is a time-based unit (e.g., milliseconds, seconds). To illus-trate, if one hundred tenant requests have a measured latency value, a "P50" percentile value of three seconds means that fifty of the one hundred measured latency values are at or below three seconds, while the other fifty of the one hundred measured latency values are above three seconds. Continu-ing this example with the same one hundred tenant requests, a "P75" percentile value of five seconds means that seventy-five of the one hundred measured latency values are at or below five seconds, while the other twenty-five of the one hundred measured latency values are above five seconds. Accordingly, the latency signal described herein includes latency values for a defined set of percentiles (e.g., "P50", "P75", "P90", "P95", "P99").

As mentioned above, previous solutions for monitoring the health of a cloud service relies on various metrics, including latency, to evaluate the performance and/or the reliability of the cloud service with respect to tenant requests. A typical latency monitor is configured to detect spikes and/or dips in the latency metric across a number of tenants. However, latency can be noisy and/or can signifi-cantly vary from one tenant to the next depending on the tenants' request patterns and request complexities. Previous solutions for monitoring latency further rely on a single percentile for detecting latency-related issues. However, the use of a single percentile has shortcomings. First, the use of the single percentile is severely sensitive to a size of the dataset (e.g., the number of measured latency values being analyzed). For instance, provided a small dataset size (e.g., measured latency values for one hundred requests, measured latency values for one thousand requests), a small number of extremely abnormal latency values (e.g., one, two, three, ten, twenty) can have a significant impact on the single percentile. Second, the use of the single percentile does not effectively scale out to various cloud services that want to use different criteria for detecting latency-related issues. Accordingly, a cloud service is required to select its own percentile as a basis for monitoring and detecting latency-related issues. The percentile selection process consumes a considerable amount of human effort in order to ensure the effectiveness of the monitoring for, and detection of, latency-related issues.

The system described herein enables a latency monitoring and/or detection approach that can be effectively scaled to multiple different cloud services operating in a distributed computing environment. The distributed computing envi-ronment is configured to generate a set of latency signals that is respectively associated with a set of resources that are allocated to and/or operated by the cloud services. In one example described below, the set of resources is divided into subsets based on a tenant consideration and a geographic region consideration. That is, a specific resource that is allocated to and/or operated by a specific cloud service is deployed such that the resource is solely used by a specific tenant within a defined geographic region where the cloud service operates. Accordingly, an analysis of a latency signal described herein is first implemented with respect to a "tenant/resource" combination.

The geographic regions in which the cloud service oper-ates can be smaller (e.g., cities, counties, states/provinces) or larger (e.g., countries, continents). A request that is received and processed within the distributed computing environment is associated with timestamp(s), a tenant identification (e.g., a customer resource identification or "CRID"), a location identification, and a measured latency value. Thus, the system can sort requests and their associated measured latency values according to tenants using the tenant identi-fications. Moreover, the system can sort requests and their associated measured latency values into a defined time bin (e.g., one minute time bins, five minute time bins, ten minute time bins, one hour time bins) using the timestamps. Fur-thermore, the system can map the requests and their asso-ciated measured latency values to defined geographic regions using the location identification.

As described in further detail below, the system first determines latency baselines at the tenant level (e.g., on a tenant-by-tenant basis). To do this, the system analyzes a training dataset to generate a tenant-specific model that defines the latency baselines. The training dataset is unique to a tenant and a geographic region in which a resource is deployed to handle the tenant's requests. Therefore, the training dataset includes percentile latency values deter-mined based on measured latency values for requests that are received and processed with respect to the aforemen-tioned tenant/resource combination in a defined time bin during a training time period (e.g., fourteen days). The system uses the training dataset to determine, or derive, a distribution for each percentile in the defined set of percen-tiles.

Another shortcoming in the aforementioned previous solutions for monitoring latency to detect latency-related issues relates to the fact that a percentile on its own fails to consider the distribution of percentile latency values, and this failure can negatively affect the quality of latency-related issue detection. Accordingly, a latency baseline defined in the tenant-specific model includes a distribution for each percentile in the defined set of percentiles. In one example, the distribution for a given percentile is a normalized distribution of the percentile latency values. The system calculates the normalized distribution of the percentile latency values based on a mean and a standard deviation. The standard deviation is the square root of the variance, and is commonly referred to as sigma, or "σ". The system calculates the deviation of each percentile latency value from the mean latency value, and squares the result. The variance is the average of the squared results and, as mentioned above, the standard deviation is equal to the square root of the variance.

Once generated, the system applies the tenant-specific model to current percentile latency values for the tenant that are associated with a current time bin. The current percentile latency values are respectively associated with the percentiles in the defined set of percentiles. When applying the tenant-specific model, the system calculates a percentile rank score for each percentile using a corresponding current percentile latency value and a corresponding distribution, which serves as the latency baseline.

Now that the system has calculated a percentile rank for each percentile in a defined set of percentiles, the system generates a latency health score vector for the tenant. The latency health score vector includes individual latency health scores for each percentile in the defined set of percentiles. Next, the system determines an overall latency health score based on the individual health scores in the latency health score vector, and compares the overall latency health score to a latency health score threshold. The latency health score threshold can be established by the cloud service provider.

If the overall latency health score for a current time bin is greater than or equal to the latency health score threshold, then the tenant is experiencing normal latency with respect to the resource deployed to the geographic region of the cloud service. In this scenario, the system designates the tenant as a healthy tenant. If the overall latency health score for the current time bin is less than the latency health score threshold, then the tenant is experiencing abnormal latency with respect to the resource deployed to the geographic region of the cloud service. In this scenario, the system flags this abnormality by designating the tenant as an unhealthy tenant. Consequently, the system makes a binary health determination, e.g., healthy or unhealthy, with respect to a tenant/resource combination for latency purposes.

In various examples, when calculating the overall latency health score, the system applies a weight to each individual latency health score, which is calculated for each percentile in the defined set of percentiles. Accordingly, a weighted average overall latency health score is used to determine the binary health of a tenant/resource combination with respect to a current time bin. In one example, the weights are even (e.g., a "0.2" weight for "P50" percentile, a "0.2" weight for "P75" percentile, a "0.2" weight for "P90" percentile, a "0.2" weight for "P95" percentile, a "0.2" weight for "P99" percentile). However, it is more likely that the weights are different (e.g., a "0.5" weight for "P50" percentile, a "0.3" weight for "P75" percentile, a "0.1" weight for "P90" percentile, a "0.08" weight for "P95" percentile, a "0.02"

weight for "P99" percentile). The weights can be default weights that are set by the cloud provider and automatically updated based on a feedback loop associated with the quality of latency-based issue detection. Alternatively, the weights can be assigned by the tenant to implement desired latency detection behavior. For example, heavier weights towards the lower percentile in the defined set of percentiles (e.g., the "P50" percentile) and lighter weights toward the higher percentile in the defined set of percentiles (e.g., the "P95" percentile or the "P99" percentile) reflects a propensity to be more sensitive to long tail latency regression. In contrast, heavier weights towards the higher percentile and lighter weights toward the lower percentile reflects a propensity to be less sensitive to long tail latency regression.

Now that the system has made binary health determinations for various tenant/resource combinations within a geographic region, the system is configured to aggregate the binary health determinations for the geographic region. More specifically, the system determines a total number of unhealthy tenants associated with the geographic region for the current time bin. The system compares the total number of unhealthy tenants to a predefined threshold number of unhealthy tenants. If the total number of unhealthy tenants is greater than the predefined threshold number of unhealthy tenants, the system generates and/or sends a notification to an owner, or a provider, of the cloud service. The notification indicates a potential latency-related issue associated with the cloud service in the geographic region. In various examples, the notification can include the identifications of the tenants impacted by the potential latency-related issue, as well as other information.

In one embodiment, the system is configured to establish the threshold number of unhealthy tenants by first calculating an N-day (e.g., seven days, fourteen days, thirty days) moving average number of unhealthy tenants, e.g., across the defined time bins in the N days. Next, the system can calculate the standard deviation associated with the N-day moving average number. The threshold number of unhealthy tenants can be established to be a predefined number of standard deviations (e.g., "1σ", "1.5 σ", "2σ") above the N-day moving average number. However, the system can establish the threshold number of unhealthy tenants in other ways as well. For example, the system can establish the threshold number of unhealthy tenants to be a predefined percentage (e.g., 10%, 20%, 30%) above the N-day moving average number.

The technical benefits of the present disclosure address the shortcomings in the previous solutions. That is, the use of a defined set of percentiles is not sensitive to a size of the dataset (e.g., the number of measured latency values being analyzed). Moreover, the use of the defined set of percentiles enables the approach to be scaled out to various cloud services that want to use different criteria for detecting latency-related issues, thereby conserving resources (e.g., processing resources, storage resources, networking resources) that would have been consumed if each different cloud service has to implement their own latency-issue monitoring and detection solution. Furthermore, the distribution of percentile latency values is considered via the percentile rank scores, and this positively affects the quality of latency-related issue detection.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4A is a diagram illustrating example training data, for a particular percentile, that is included in a training dataset and that is useable to establish a baseline distribution based on a mean and a standard deviation.

FIG. 5 is a diagram illustrating an example latency health score vector that is useable, along with defined weights, to calculate an overall latency health score for a tenant.

FIG. 8 is a flow diagram showing aspects of a method for detecting latency-related issues for a cloud service.

DETAILED DESCRIPTION

Figure 1:
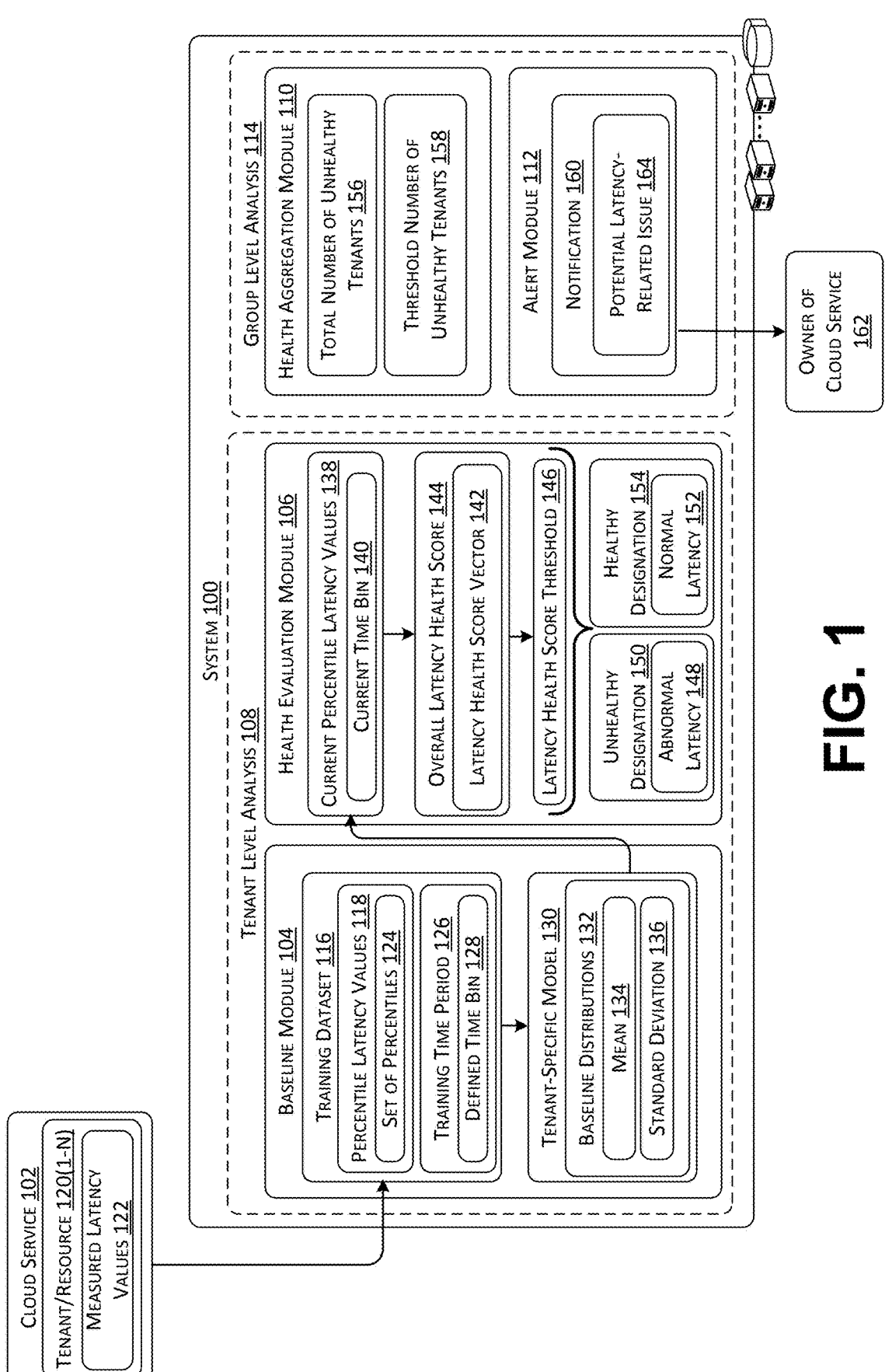
FIG. 1 is a diagram illustrating an example environment in which a system detects latency-related issues for a cloud service.

The techniques and technologies disclosed herein effectively detect latency issues for a cloud service operating in a distributed computing environment. To detect the latency issues for the cloud service, the system analyzes a latency signal on a tenant-by-tenant basis. As described herein, the latency signal includes latency values for a defined set of percentiles. These latency values are referred to herein as "percentile" latency values. The latency signal is generated and/or collected with respect to a defined time bin (e.g., one minute time bins, five minute time bins, ten minute time bins, one hour time bins).

As described above, solutions for monitoring latency rely on a single percentile for detecting latency-related issues. However, the use of a single percentile has shortcomings.

First, the use of the single percentile is severely sensitive to a size of the dataset (e.g., the number of measured latency values being analyzed). For instance, provided a small dataset size (e.g., measured latency values for one hundred requests, measured latency values for one thousand requests), a small number of extremely abnormal latency values (e.g., one, two, three, ten, twenty) can have a significant impact on the single percentile. Second, the use of the single percentile does not effectively scale out to various cloud services that want to use different criteria for detecting latency-related issues. Accordingly, a cloud service is required to select its own percentile as a basis for monitoring and detecting latency-related issues. The percentile selection process consumes a considerable amount of human effort in order to ensure the effectiveness of the monitoring for, and detection of, latency-related issues. Another shortcoming in the aforementioned previous solutions for monitoring latency to detect latency-related issues relates to the fact that a percentile on its own fails to consider the distribution of percentile latency values, and this failure can negatively affect the quality of latency-related issue detection.

To address this challenge, the system described herein first determines latency baselines at the tenant level (e.g., on a tenant-by-tenant basis) and compares a tenant's current percentile latency values to the latency baselines. If the comparison yields that the current percentile latency values for the tenant are closely following the latency baselines, the tenant is deemed healthy. However, if the comparison yields that the current percentile latency values for the tenant are not closely following the latency baselines, the tenant is deemed unhealthy. Once the system has made a binary health determination for various tenants on a tenant-by-tenant basis, the system is configured to aggregate the unhealthy determinations across a group of tenants to determine whether the cloud service is experiencing latency-related issues.

Various examples, scenarios, and aspects of the disclosed techniques that detect latency-related issues for a cloud service are described below with reference to FIGS. 1-9.

FIG. 1 illustrates an example environment in which a system 100 effectively detects latency-related issues for a cloud service 102. Operation of the cloud service 102 may be limited to a cloud platform (e.g., one or more datacenters). Alternatively, operation of the cloud service 102 may expand across a distributed computing environment (e.g., one or more datacenters, one or more edge networks, one or more on-premises networks, or a combination thereof).

The system 100 includes a baseline module 104 and a health evaluation module 106 that analyze data and/or operate at the tenant level 108. Furthermore, the system 100 includes a health aggregation module 110 and an alert module 112 that analyze data and/or operate at the group level 114 (e.g., a group of tenants). The number of modules illustrated in FIG. 1 is just an example, and the number can vary. That is, functionality described herein in association with the illustrated modules can be performed by a fewer number of modules or a larger number of modules on one device (e.g., server) in the system 100 or spread across multiple devices in the system 100.

The baseline module 104 is configured to receive and/or access a training dataset 116. The training dataset 116 includes percentile latency values 118, which may alternatively be referred to herein as the latency signal. In one example, the training dataset 116 is unique to a tenant and a geographic region in which a resource is deployed to handle the tenant's requests. As described above, the resource is allocated to and/or operated by the cloud service 102 and is deployed such that the resource is solely used by a specific tenant within a defined geographic region where the cloud service 102 operates. Therefore, the percentile latency values 118 represent not only a specific tenant, but a particular resource deployed in association with the distributed computing environment.

Accordingly, FIG. 1 illustrates that the cloud service 102 is configured with an N number of tenant/resource combinations 120(1-N). It is noted that N is used throughout this document to represent a number (e.g., one, two, three, five, ten, one hundred, one thousand, one million) for different elements. While the number N from one element to another may be the same, it is more likely that the number N differs from one element to the next (e.g., the number of tenant/resource combinations is different than the number of geographic regions in which the cloud service 102 operates).

As mentioned above, the training dataset 116 includes percentile latency values 118. The percentile latency values 118 are determined based on measured latency values 122 associated with requests that are received and processed (e.g., responded to) with respect to a particular tenant/resource combination 120(1). A percentile is a value at or below which a given percentage of values falls. A percentile may be represented in the format "PX", where "X" equals a defined percentile between zero and one hundred (e.g., "X"=5%, "X"=50%, "X"=75%, "X"=99%, "X"=99.9%). A percentile is expressed in the same measurement unit at which the values are measured. With respect to latency, this measurement unit is a time-based unit (e.g., milliseconds, seconds). To illustrate, if one hundred tenant requests have a measured latency value 122, a "P50" percentile latency value 118 of three seconds means that fifty of the one hundred measured latency values are at or below three seconds, while the other fifty of the one hundred measured latency values are above three seconds. Continuing this example with the same one hundred tenant requests, a "P75" percentile latency value 118 of five seconds means that seventy-five of the one hundred measured latency values are at or below five seconds, while the other twenty-five of the one hundred measured latency values are above five seconds.

The training dataset 116 includes percentile latency values 118 for a defined set of percentiles 124 (e.g., "P50", "P75", "P90", "P95", "P99"). Moreover, the training dataset 116 can be limited to a predefined training time period 126 (e.g., the most recent seven days, the most recent fourteen days, the most recent two months, the most recent year) to better reflect up-to-date latency tendencies. Furthermore, the training dataset 116 is sorted according to a defined time bin 128 (e.g., one minute time bins, five minute time bins, ten minute time bins, one hour time bins).

Using the training dataset 116, the baseline module 104 generates a tenant-specific model 130 that defines baseline distributions 132 for each of the percentiles in the defined set of percentiles 124. In one example, the baseline distribution 132 for a given percentile is a normalized distribution of the percentile latency values 118. The baseline module 104 calculates the normalized distribution of the percentile latency values 118 based on a mean 134 and a standard deviation 136. The standard deviation 136 is the square root of the variance, and is commonly referred to as sigma, or "σ". The system calculates the deviation of each percentile latency value from the mean 134 latency value, and squares the result. The variance is the average of the squared results and, as mentioned above, the standard deviation 136 is equal to the square root of the variance. The normal distribution can be determined using the probability density function, as follows in example equation (1):

$$f(x) = \frac{1}{\sigma\sqrt{2\pi}} e^{-\frac{1}{2}(\frac{x-\mu}{\sigma})^2} \qquad \text{equation (1)}$$

Here, f(x) is the probability, x is the value of the percentile latency value 118, μ is the mean 134, σ is the standard deviation 136, and σ² is the variance. Once generated, the health evaluation module 106 applies the tenant-specific model 130 to current percentile latency values 138 for the tenant that are associated with a current time bin 140. The current percentile latency values 138 are respectively associated with the percentiles in the defined set of percentiles 124.

When applying the tenant-specific model 130, the health evaluation module 106 calculates a percentile rank score for each percentile using a corresponding current percentile latency value 138 and a corresponding baseline distribution 132, which serves as the latency baseline. In one example, a percentile rank is calculated for a normalized distribution starting with equation (2):

$$z = \frac{x-\mu}{\sigma} \qquad \text{equation (2)}$$

Here, x is the current percentile latency value 138 for a given percentile 124, μ is the mean 134 of the percentile latency values 118 in the training dataset 116 for the given percentile 124, σ is the standard deviation 136 of the percentile latency values 118 in the training dataset 116 for the given percentile 124, and z is a z-score that represents a number of standard deviations that the current percentile latency value 138, x, is away from the mean 134, μ. The health evaluation module 106 uses a z-table to determine the percentile rank score. That is, the z-table maps a z-score to a percentile rank.

Now that the health evaluation module 106 has calculated a percentile rank for each percentile in a defined set of percentiles 124, the health evaluation module 106 generates a latency health score vector 142 for the tenant. The latency health score vector 142 includes individual latency health scores for each percentile in the defined set of percentiles 124. A percentile health score (PHS) can be calculated as follows in equation (3), where "PRS" is the percentile rank score:

$$PHS = (1 - PRS) * 100 \qquad \text{equation (3)}$$

Next, the health evaluation module 106 determines an overall latency health score 144 for each percentile in the defined set of percentiles 124 based on the latency health score vector 142 and compares the overall latency health score 144 to a latency health score threshold 146. The latency health score threshold 146 can be established by the cloud service 102.

If the overall latency health score 144 for the current time bin 140 is less than the latency health score threshold 146, then the tenant is determined to be experiencing abnormal latency 148 with respect to the resource deployed to the geographic region of the cloud service 102. In this scenario, the health evaluation module 106 flags this abnormality by designating the tenant as an unhealthy tenant 150. If the overall latency health score 144 for the current time bin 140 is greater than or equal to the latency health score threshold 146, then the tenant is determined to be experiencing normal latency 152 with respect to the resource deployed to the geographic region of the cloud service 102. In this scenario, the health evaluation module 106 designates the tenant as a healthy tenant 154. Consequently, the system makes a binary health determination, e.g., healthy or unhealthy, with respect to a tenant/resource combination 120(1-N) for latency purposes.

Now that the system 100 has made a binary health determination for various tenant/resource combinations 120 (1-N), the analysis moves to the group level 114. That is, the health aggregation module 110 is configured to aggregate the binary health determinations, e.g., with respect to a particular geographic region. More specifically, the health aggregation module 110 determines a total number of unhealthy tenants 156 associated with the geographic region for the current time bin 140. The health aggregation module 110 compares the total number of unhealthy tenants 156 to a predefined threshold number of unhealthy tenants 158. If the total number of unhealthy tenants 156 is greater than the predefined threshold number of unhealthy tenants 158, the alert module 112 generates and/or sends a notification 160 to an owner 162, or a provider, of the cloud service 102. The notification 160 indicates a potential latency-related issue 164 associated with the cloud service 102 in the particular geographic region. For example, the notification 160 serves as an indication to perform root-cause analysis to determine whether the resources deployed in a geographic region for use by a group of tenants are experiencing unexpected latency.

Figure 2:
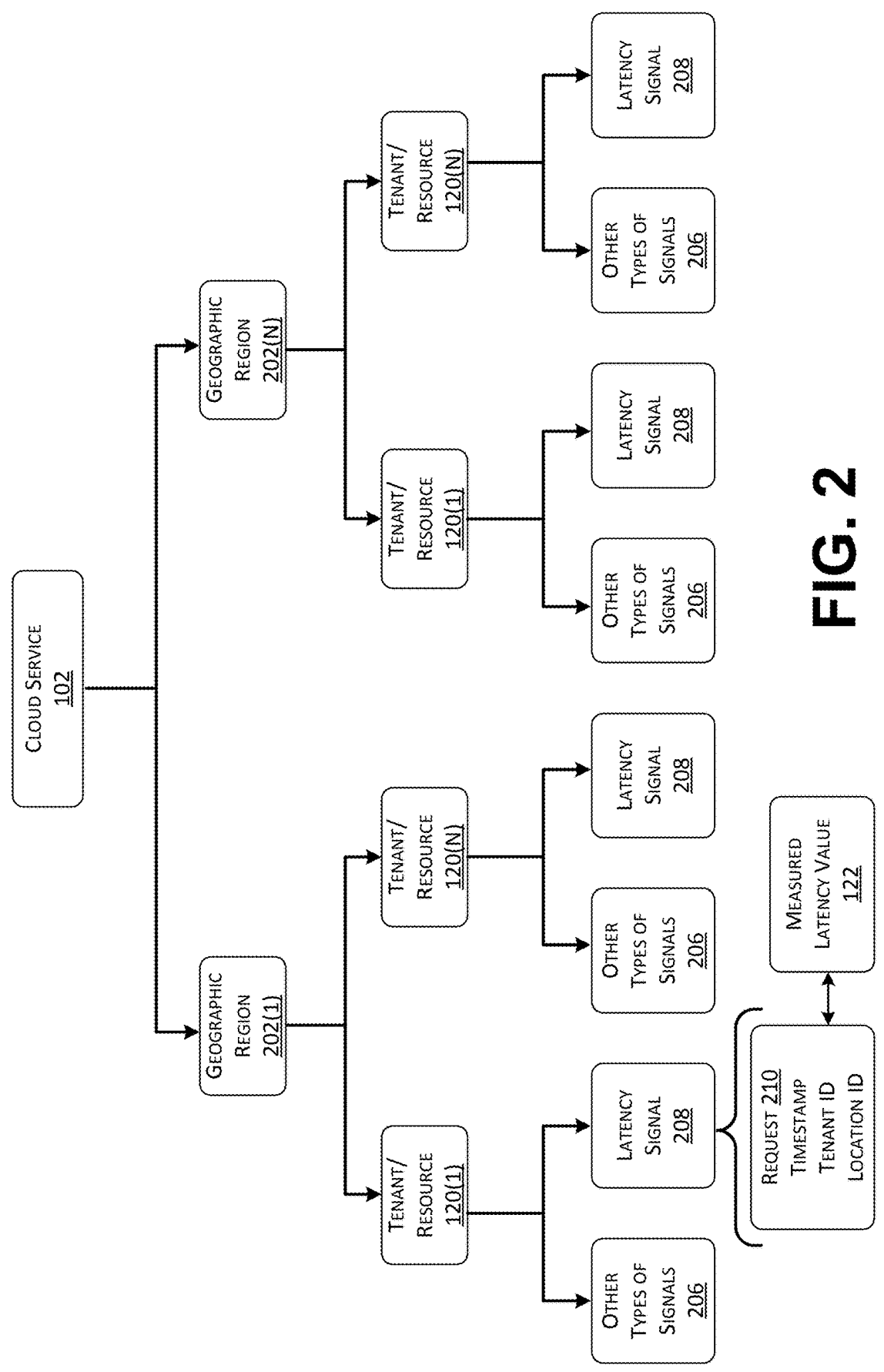
FIG. 2 is a diagram illustrating an example hierarchy within which a cloud service deploys request handling resources for use by different tenants.

FIG. 2 is a diagram illustrating an example hierarchy within which a cloud service 102 deploys resources for use by different tenants. As shown, the cloud service 102 is configured to operate in geographic regions 202(1-N). The geographic regions 202(1-N) in which the cloud service operates can be smaller (e.g., cities, counties, states/provinces) or larger (e.g., countries, continents). As described above, the cloud service 102 includes various resources that are individually deployed for, and dedicated to, specific tenants. Accordingly, FIG. 2 illustrates that each of the individual regions 202(1-N) are divided into tenant/resource combinations 120(1-N), where N in this context may be different from one geographic region to a next geographic region. In one example, the tenant/resource combination is an AZURE RESOURCE MANAGER (ARM) resource.

While previous solutions for monitoring the health of a cloud service 102 may rely on metrics (e.g., throughput, success rate, error rate) that are represented in FIG. 2 as other types of signals 206, the techniques described herein focus on analysis of latency signal 208. As described above, the latency signal 208 reflects percentile latency values 118 for a defined set of percentiles 124. The percentile latency values 118 are calculated based on tenant requests that are received and/or handled on behalf of a tenant per a defined time bin (e.g., five minute time bins). As shown in FIG. 2, a request 210 is associated with timestamp(s), a tenant identification (e.g., a customer resource identification or "CRID"), a location identification, and a measured latency value 122. Thus, the cloud service 102 can sort requests 210 according to tenants using the tenant identifications and can sort the requests 210 into defined time bins using the timestamps. Moreover, the cloud service 102 can map the requests 210 to defined geographic regions 202(1-N) using the location identification.

In one embodiment, the baseline module 104 uses a sampling algorithm to select which tenant/resource combinations 120(1-N) contribute to the training dataset 116. Given that some cloud services have millions of tenants, a sampling algorithm improves computational efficiency for limiting the analysis/calculations performed herein on a sampled set of the millions of tenants. In one example, the sampling algorithm includes a default sampling rate (e.g., "0.5"), a minimum sample size (e.g., "100"), and a maximum sample size (e.g., "100,000"). If a geographic region has a number of N tenant/resource combinations 120(1-N) that is less than the minimum sample size (e.g., N<"100"), then all the tenant/resource combinations 120(1-N) are used for training purposes. If a geographic region has a number of N tenant/resource combinations 120(1-N) that is greater than the minimum sample size (e.g., N>"100") and less than the maximum sample size (e.g., N<"100,000"), but using the default sampling rate produces a number that is less than the minimum sample size, then the sampling rate is increased to ensure the minimum sample size is satisfied. If a geographic region has a number of N tenant/resource combinations 120(1-N) that is greater than the maximum sample size (e.g., N>"100,000"), but using the default sampling rate produces a number that is still larger than the maximum sample size, then the sampling rate is decreased to ensure the maximum sample size is satisfied. If a geographic region has a number of N tenant/resource combinations 120(1-N) that is greater than the minimum sample size (e.g., N>"100") and less than the maximum sample size (e.g., N<"100,000"), and using the default sampling rate produces a number that is between the minimum sample size and the maximum sample size, then the default sampling rate is used to sample the number of N tenant/resource combinations 120(1-N).

Figure 3:
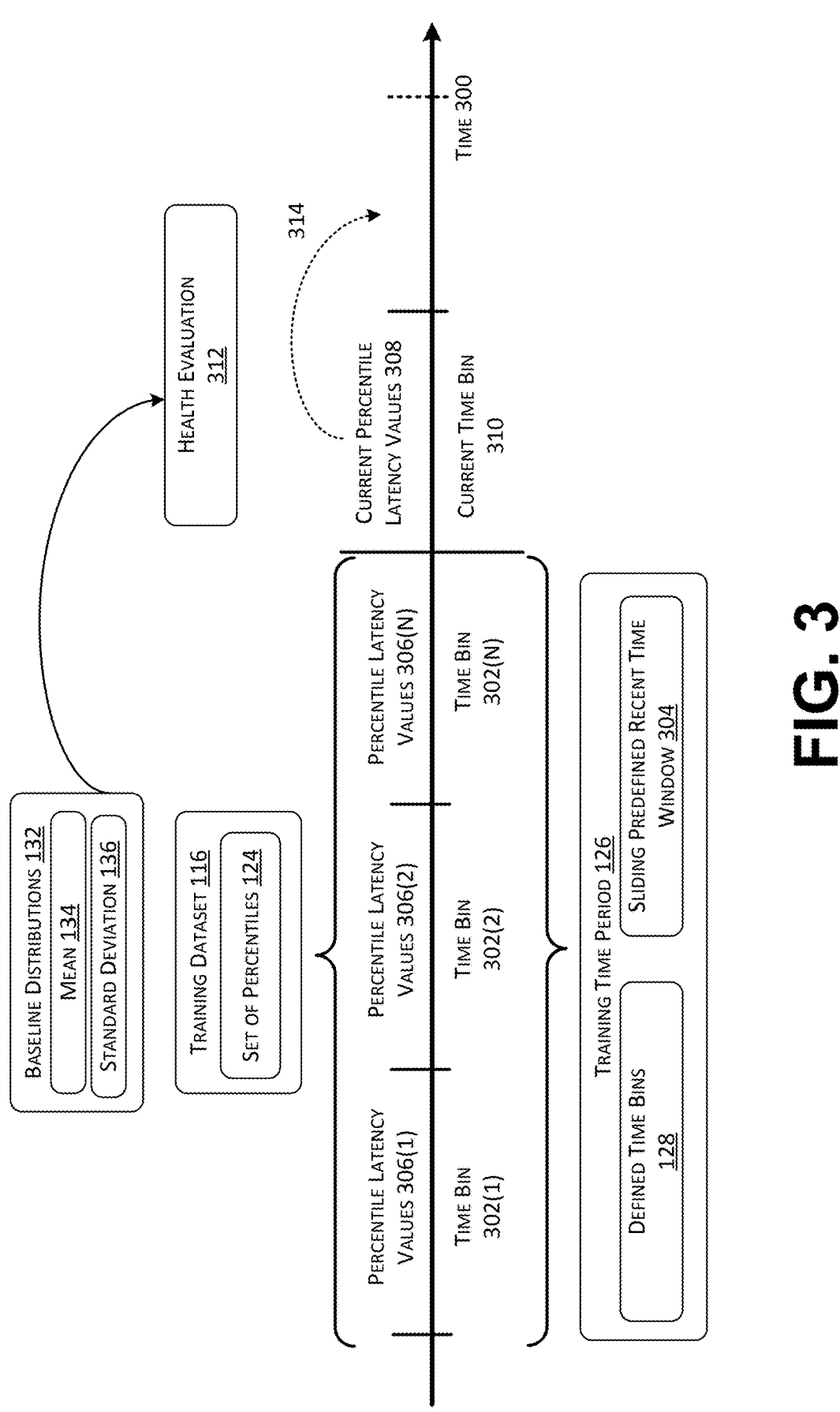
FIG. 3 is a diagram illustrating timing considerations with respect to a training time period and a current time bin.

FIG. 3 is a diagram illustrating timing considerations with respect to a training time period and a current time bin. As shown, FIG. 3 includes a time axis 300. The training time period 126 is divided into a defined time bin 128 (e.g., one minute time bins, five minute time bins, ten minute time bins, one hour time bins). More specifically, the defined time bin 128 is represented by time bin 302(1), time bin 302(2), and time bin 302(N). Thus, three time bins are shown for ease of discussion, i.e., N in this example equals three. However, the number N of defined time bins in most training time periods 126 is much larger (e.g., hundreds or even thousands of defined time bins). In one example, the training time period 126 is a sliding predefined recent time window 304 (e.g., the most recent day, the most recent week, the most recent two weeks, the most recent month, the most recent year).

Each time bin 302(1-N) is configured to produce percentile latency values 306(1-N) for the percentiles in the defined set of percentiles 124 (e.g., "P50", "P75", "P90", "P95", "P99"). Accordingly, the training dataset 116 includes the percentile latency values 306(1-N). As mentioned above, the baseline module 104 generates a tenant-specific model 130 that includes baseline distributions 132 calculated using the mean 134 and the standard deviation 136 of a given percentile's percentile latency values across time bins 302(1-N). An example of this is provided below with respect to FIGS. 4A and 4B.

The time axis 300 further shows that current percentile latency values 308 are received and/or accessed for a current time bin 310 (e.g., the most recent five minutes). The health evaluation module 106 is configured to use the baseline distributions 132 and the current percentile latency values 308 to perform a health evaluation 312 to determine a healthy 154 or an unhealthy 150 designation for the tenant with respect to the current time bin 310. As represented by the dashed line/arrow 314, the health evaluation 312 is repeated as time progresses and "new" current percentile latency values for new current time bins are received or become accessible.

FIG. 4A is a diagram illustrating example training data, for a particular percentile, that is included in a training dataset and that is useable to establish a baseline distribution 132 based on a mean 134 and a standard deviation 136. FIG. 4A includes a table 400 with a first column reflecting the index 402. The index 402 identifies to a second column defining a time interval 404 for the defined time bin 128. The particular percentile shown in the example of FIG. 4A is the seventy-fifth percentile, or "P75". Accordingly, the index 402 further identifies a "P75" latency value 406 for the time interval 404. In various examples, and for illustration purposes, the index 402 may further identify a description 408 of the "P75" latency value 406.

In the example of FIG. 4A, the training time period 126 is fourteen days and the defined time bin 128 is five minutes. Accordingly, the table 400 includes "504" rows, as there are "4032" five minute time bins in fourteen days. A first row represented by index "1" captures the time interval on "1 May 2024 from 12:00-12:05 am" and the "P75" latency value is three seconds, which means that seventy-five percent of the requests were processed in less than three seconds and twenty-five percent of the requests were processed in more than three seconds. A second row represented by index "2" captures the time interval "1 May 2024 from 12:05-12:10 am" and the "P75" latency value is four seconds, which means that seventy-five percent of the requests were processed in less than four seconds and twenty-five percent of the requests were processed in more than four seconds. A third row represented by index "3" captures the time interval "1 May 2024 from 12:10-12:15 am" and the "P75" latency value is five seconds, which means that seventy-five percent of the requests were processed in less than five seconds and twenty-five percent of the requests were processed in more than five seconds. A fourth row represented by index "4" captures the time interval "1 May 2024 from 12:15-12:20 am" and the "P75" latency value is eight seconds, which means that seventy-five percent of the requests were processed in less than eight seconds and twenty-five percent of the requests were processed in more than eight seconds. A fifth row represented by index "5" captures the time interval "1 May 2024 from 12:20-12:25 am" and the "P75" latency value is four seconds, which means that seventy-five percent of the requests were processed in less than four seconds and twenty-five percent of the requests were processed in more than four seconds.

For ease of discussion, the table 400 skips a large number of rows and returns at a "4029$^{th}$" row represented by index "4029" that captures the time interval "14 May 2024 from 11:40-11:45 pm" and a "P75" latency value of three seconds, which means that seventy-five percent of the requests were processed in less than three seconds and twenty-five percent of the requests were processed in more than three seconds. A "4030$^{th}$" row represented by index "4030" captures the time interval "14 May 2024 from 11:45-11:50 pm" and the "P75" latency value is two seconds, which means that seventy-five percent of the requests were processed in less than two seconds and twenty-five percent of the requests were processed in more than two seconds. A "4031$^{st}$" row represented by index "4031" captures the time interval "14 May 2024 from 11:50-11:55 pm" and the "P75" latency value is ten seconds, which means that seventy-five percent of the requests were processed in less than ten seconds and twenty-five percent of the requests were processed in more than ten seconds. Finally, a "4032$^{nd}$" row represented by index "4032" captures the time interval "14 May 2024 from 11:55-12:00 am" and the "P75" latency value is eighteen seconds, which means that seventy-five percent of the requests were processed in less than eighteen seconds and twenty-five percent of the requests were processed in more than eighteen seconds.

The number of entries/rows actually shown in the example training dataset of FIG. 4A is limited for ease of discussion. Moreover, the "P75" latency values shown are merely examples for ease of discussion as well. The point being is that the baseline module 104 can establish a baseline distribution 132 for the "P75" percentile by calculating the mean 134 of the "P75" values 406 and a standard deviation 136 of the "P75" latency values 406.

Figure 4B:
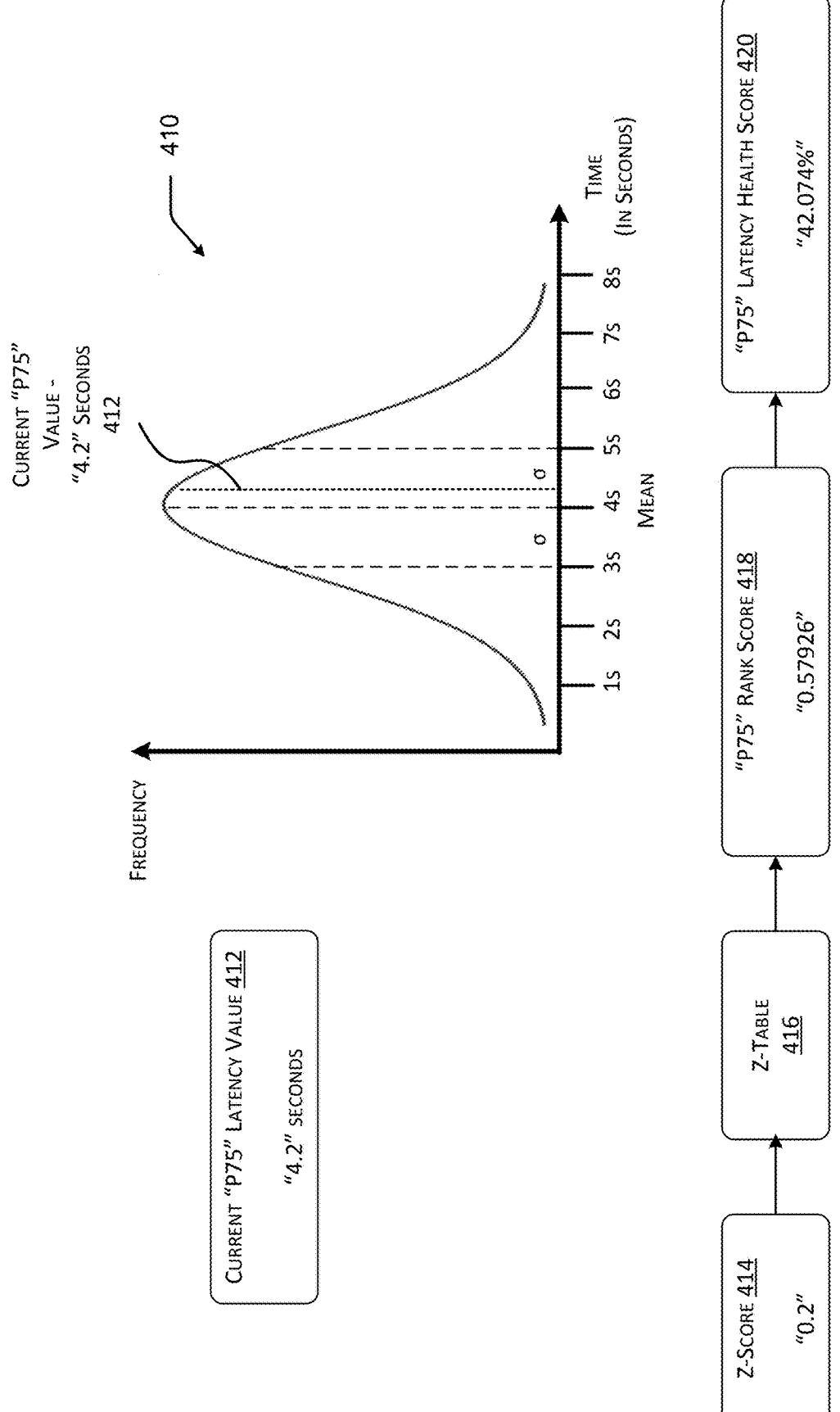
FIG. 4B is a diagram illustrating how the baseline distribution from FIG. 4B is used to determine a latency health score based on a current percentile latency value for the particular percentile.

Continuing the example of FIG. 4A in FIG. 4B, it is assumed that the mean 134 is four seconds and the standard deviation 136 is one second. The mean 134 and the standard deviation are illustrated by a first type of dashed lines via the normalized distribution shown via graph 410 (e.g., as determined via equation (1) shown above). FIG. 4B further shows that the current "P75" latency value 412 for a current time bin (e.g., "15 May 2024 from 12:00-12:05 am") is "4.2" seconds. The current "P75" latency value 412 of "4.2" seconds is also shown via the graph 410 as a second type of dashed line.

The health evaluation module 106 calculates a percentile rank score for the current "P75" latency value 412 of "4.2" seconds in accordance with equation (2) above, which is reflected here in equation (4) with example values plugged in:

$$0.2 = \frac{4.2 - 4}{1} \qquad \text{equation (4)}$$

Here, "0.2" is the z-score 414 that represents a number of standard deviations that the current "P75" latency value 412 of "4.2" seconds is away from the mean 134 of four seconds. The health evaluation module 106 uses a z-table 416 to determine the "P75" rank score 418. That is, the z-table 416 maps the z-score 414 of "0.2" to a percentile rank score "0.57926". Accordingly, the current "P75" latency value 412 of "4.2" seconds is determined to be slower, in the context of time, than 57.926% of the "P75" latency values in the normalized distribution.

Next, the health evaluation module 106 determines a "P75" latency health score 420 of "42.074%" for the current time bin in accordance with equation (3) above, which is reflected here in equation (5) with example values plugged in:

$$42.074 = (1 - 0.57926) * 100 \qquad \text{equation (5)}$$

FIG. 5 is a diagram illustrating an example latency health score vector 502 that is populated with individual latency health scores for each percentile 504 in the defined set of percentiles 124. The latency health score vector 502 is useable, along with defined weights 506, to calculate an overall latency health score 508 for a tenant. As shown, the individual latency health score for percentile "P50" is "35.012". The individual latency health score for percentile "P75" (from the example in FIGS. 4A and 4B) is "42.074". The individual latency health score for percentile "P90" is "56.498". The individual latency health score for percentile "P95" is "58.248". And the individual latency health score for percentile "P99" is "65.321". The individual health scores are multiplied by defined weights 506 (which collectively add up to one) to produce the values in the output column 508. The values in the output column 508 are then summed to determine the overall latency health score 510, e.g., "41.742", which is a normalized value between zero and one hundred.

Accordingly, the health evaluation module 106 is able to use a weighted average overall latency health score 510 to determine the binary health of a tenant/resource combination with respect to a current time bin. In the example shown in FIG. 5, the weights 506 are different, e.g., a "0.5" weight for "P50" percentile, a "0.3" weight for "P75" percentile, a "0.1" weight for "P90" percentile, a "0.08" weight for "P95" percentile, a "0.02" weight for "P99" percentile. Alternatively, the weights 506 can be the same or even, e.g., a "0.2" weight for "P50" percentile, a "0.2" weight for "P75" percentile, a "0.2" weight for "P90" percentile, a "0.2" weight for "P95" percentile, a "0.2" weight for "P99" percentile. The weights 506 can be default weights that are set by the owner of the cloud service 162 and automatically updated based on a feedback loop associated with the quality of latency-based issue detection. Alternatively, the weights 506 can be assigned by the tenant to implement desired latency detection behavior. For example, heavier weights towards the lower percentile in the defined set of percentiles (e.g., the "P50" percentile) and lighter weights toward the higher percentile in the defined set of percentiles (e.g., the "P95" percentile or the "P99" percentile) reflects a propensity to be more sensitive to long tail latency regression. In contrast, heavier weights towards the higher percentile and lighter weights toward the lower percentile reflects a propensity to be less sensitive to long tail latency regression.

Figure 6:
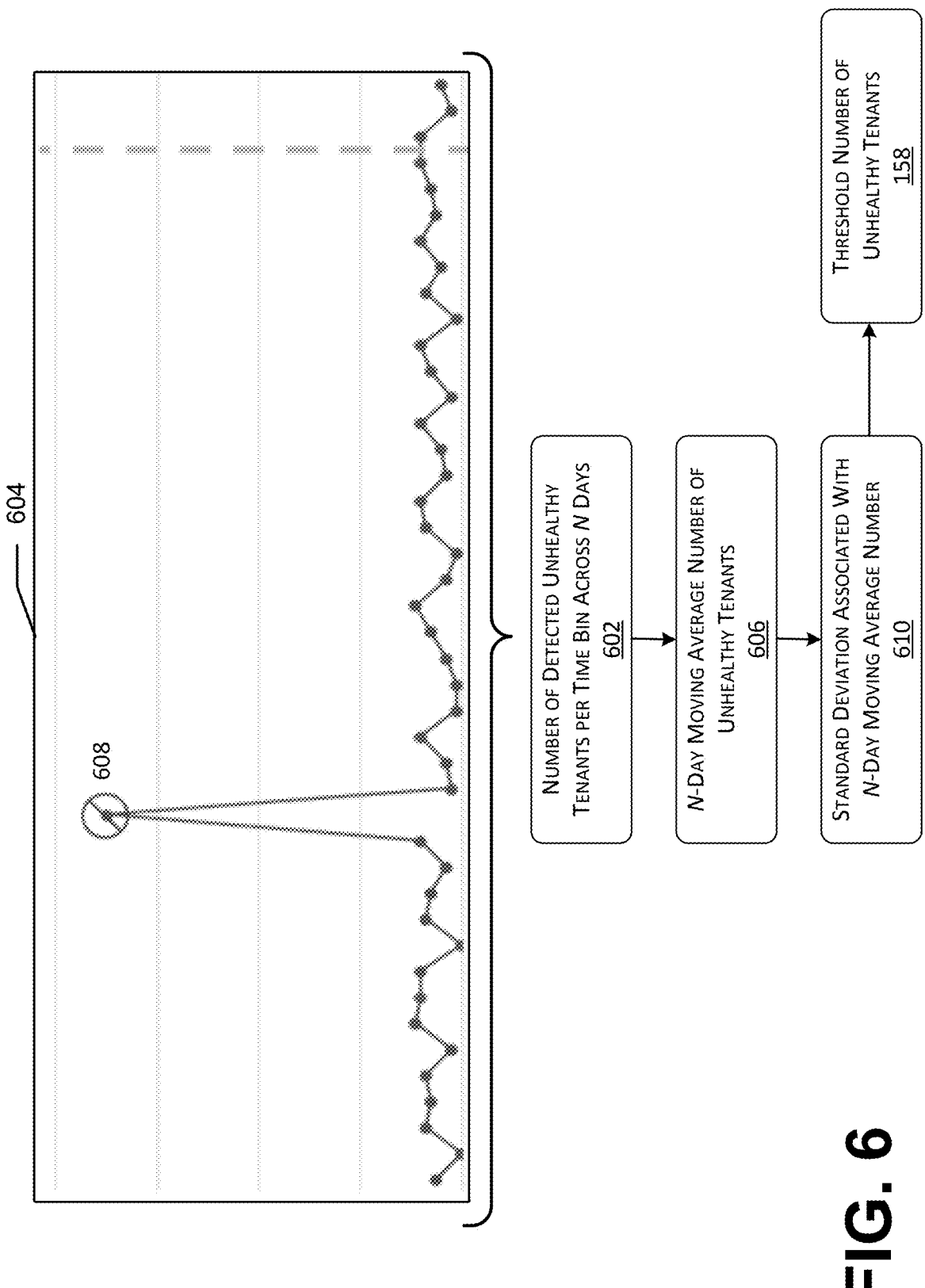
FIG. 6 is a diagram illustrating an example approach to calculating the threshold number of unhealthy tenants.

FIG. 6 is a diagram illustrating an example approach to calculating the threshold number of unhealthy tenants 158. In this example, the health aggregation module 110 receives values representing the number of detected unhealthy tenants, per time bin, across a defined N number of time units such as days 602 (e.g., N equals seven days, fourteen days, thirty days), as plotted via chart 604. The health aggregation module 110 then calculates an N-day moving average number of unhealthy tenants 606. In various examples, the health aggregation module 110 omits anomalous values (e.g., removes the highest 2% of values and/or the lowest 2% of values) when calculating the N-day moving average number of unhealthy tenants 606. This removes values that have a significant impact on the N-day moving average number of unhealthy tenants 606, such as value 608.

Next, the health aggregation module 110 calculates the standard deviation 610 associated with the N-day moving average number 606. The standard deviation 610 is the square root of the variance of the N-day moving average number 606. The health aggregation module 110 calculates the deviation of each number of unhealthy tenants per time bin, and squares the result. The variance is the average of the squared results and, as mentioned above, the standard deviation 610 is equal to the square root of the variance.

The health aggregation module 110 sets the threshold number of unhealthy tenants 158 to be a predefined number of standard deviations 610 (e.g., "2σ", "3σ", "4σ", "5σ") above the N-day moving average number 606. However, the health aggregation module 110 can set the threshold number of unhealthy tenants 158 in other ways as well. For example, the health aggregation module 110 can set the threshold number of unhealthy tenants 158 to be a predefined percentage (e.g., 10%, 20%, 30%) above the N-day moving average number 606.

Figure 7:
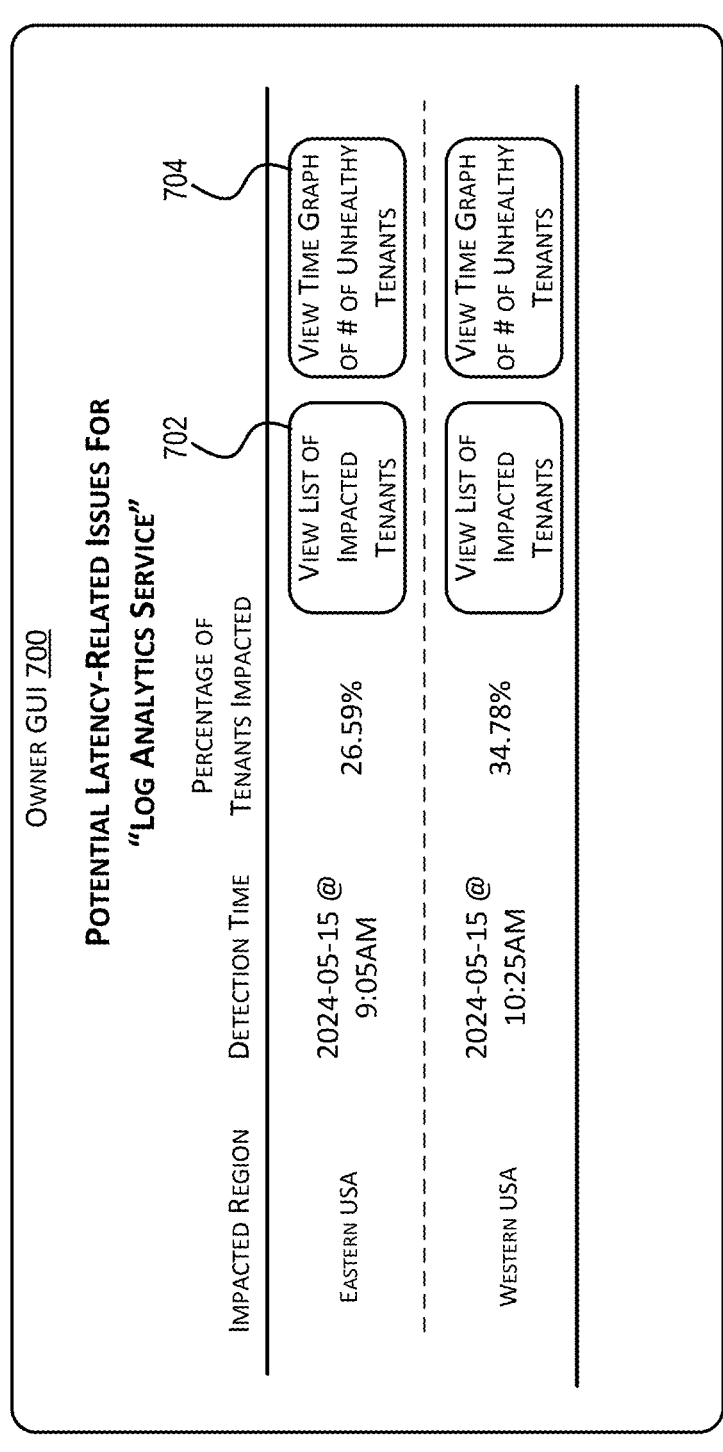
FIG. 7 illustrates an example graphical user interface that includes a notification and/or other information related to a latency-related issue.

FIG. 7 illustrates an example graphical user interface (GUI) 700 that includes a notification 160 of a potential latency-related issue and/or other information related to the potential latency-related issue. As described above, the notification 160 is provided to an owner of the cloud service 162 (e.g., a representative tasked with reviewing and/or mitigating the latency-related issue). In the example of FIG. 7, the cloud service 102 is a "Log Analytics Service", and thus, the notifications 160 in the GUI 700 list anomalous latency-related behavior that are specific to the "Log Analytics Service".

In this example, an individual notification 160 includes information for an individual entry in the GUI 700. The first entry in the GUI 700 indicates that the impacted geographic region is "Eastern USA" and the detection time is "2024-05-15 @ 9:05 AM". Moreover, the entries can include information indicative of the severity of the latency-related issue, such as the percentage of tenants impacted (e.g., "26.59%" in the first entry). The second entry in the GUI 700 indicates that the impacted geographic region is "Western USA" and the detection time is "2024-05-15 @ 10:25 AM". Moreover, the second entry indicates that "34.78%" of tenants were impacted in the "Western USA" geographic region. Each entry can be associated with selectable GUI elements configured to convey additional information. For instance, a first GUI element 702, when selected, enables a user to view the list of impacted tenants (e.g., the actual tenant identifications). Moreover, a second GUI element 704, when selected, enables the user to view a time graph of a number of unhealthy tenants. Accordingly, the user can review the aggregate latency-related behavior that led to a large-scale anomaly being detected.

Proceeding to FIG. 8, aspects of a method 800 for detecting latency-related issues for a cloud service are shown. With respect to FIG. 8, the process 800 begins at operation 802 where the system generates a tenant-specific model 130 for a latency signal by analyzing a training dataset 116 for a tenant 120 over a training time period 126. As described above, the training dataset includes respective percentile latency values 118, per a defined time bin 128, for each percentile in a defined set of percentiles 124 and the respective percentile latency values 118 are associated with a service 102 offered by a cloud provider. Furthermore, the tenant-specific model 130 defines a distribution 132 based on a mean 134 and a standard deviation 136 of the respective percentile latency values 118 for each percentile in the defined set of percentiles 124.

At operation 804, the system accesses current percentile latency values 138 associated with the tenant for a current time bin 140. The current percentile latency values 138 are respectively associated with percentiles in the defined set of percentiles 124.

At operation 806, the system generates a latency health score vector 142 for the tenant and for the current time bin by determining percentile health scores for each percentile in the defined set of percentiles 124 via a comparison of a current percentile latency value 138 to the corresponding distribution 132 in the tenant-specific model 130.

At operation 808, the system calculates an overall latency health score 144 based on a plurality of latency health scores in the latency health score vector 142.

At operation 810, the system determines that the overall latency health score is less than a latency health score threshold 146.

At operation 812, the system designates the tenant as an unhealthy 150 tenant due to abnormal latency in response to determining that the overall latency health score is less than the latency health score threshold.

At operation 814, the system determines that a total number of unhealthy tenants 156 for the current time bin is greater than a predefined threshold number of unhealthy tenants 158.

At operation 816, the system sends, to an owner 162 of the service and based on the total number of unhealthy tenants being greater than the predefined threshold number of unhealthy tenants, a notification 160 indicating a potential latency issue 164 associated with the service.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described method blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 800 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the method 800 may also be implemented in other ways. In addition, one or more of the operations of the method 800 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 9:
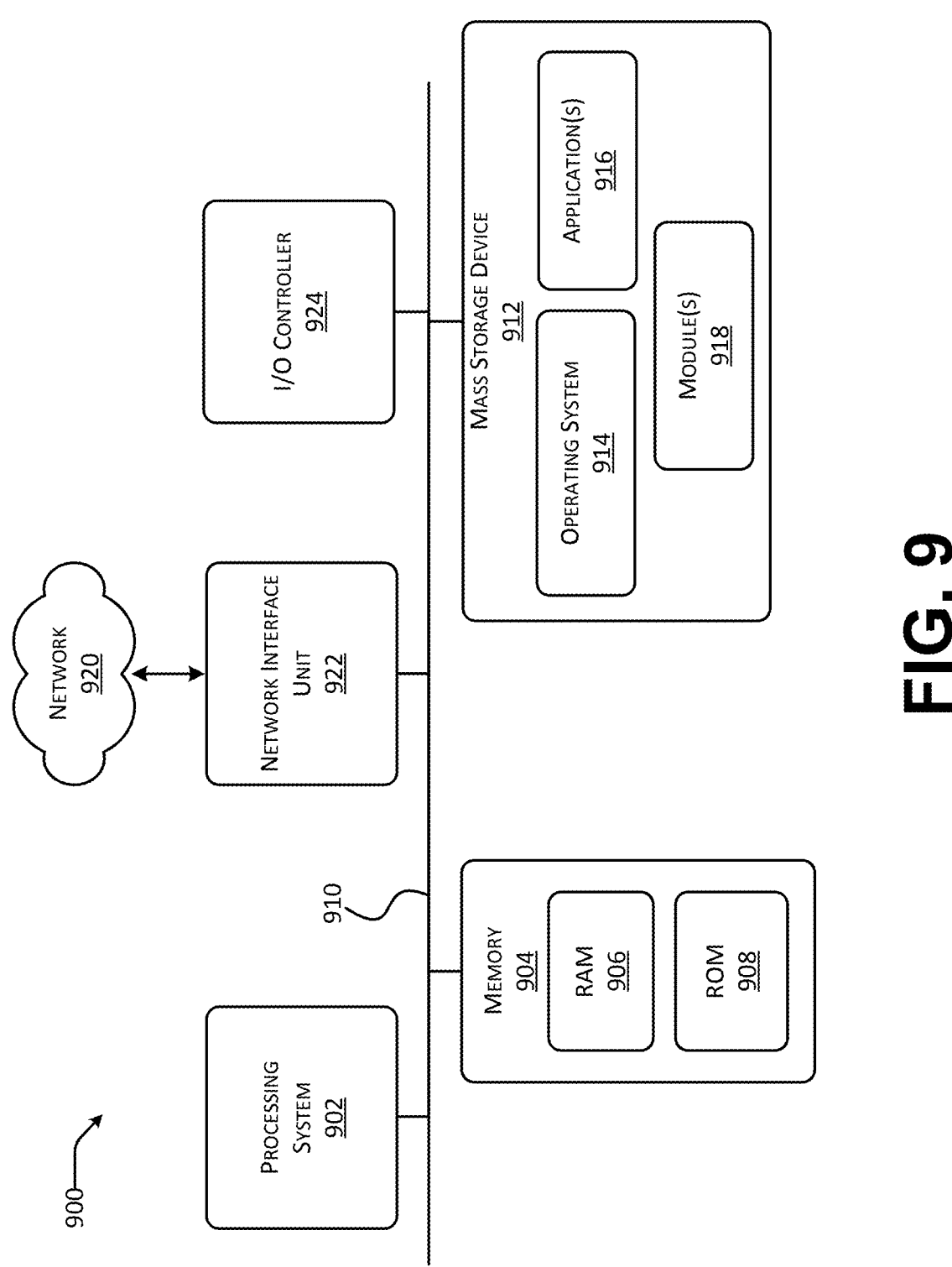
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the system 100, capable of executing computer instructions (e.g., a module described herein). The computer architecture 900 illustrated in FIG. 9 includes processing system 902, a system memory 904, including a random-access memory 906 (RAM) and a read-only memory (ROM) 908, and a system bus 910 that couples the memory 904 to the processing system 902. The processing system 902 comprises processing unit(s). In various examples, the processing unit(s) of the processing system 902 are distributed. Stated another way, one processing unit of the processing system 902 may be located in a first location (e.g., a rack within a datacenter) while another processing unit of the processing system 902 is located in a second location separate from the first location.

Processing unit(s), such as processing unit(s) of processing system 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing system 902 through a mass storage controller connected to the bus 910. The mass storage device 912 and its associated computer-readable media provide non-volatile storage for the computer architecture 900. Although the description of computer-readable media contained herein refers to a mass storage device, the computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

The software components described herein may, when loaded into the processing system 502 and executed, transform the processing system 902 and the overall computer architecture 900 from a general-purpose computing system into a special-purpose computing system customized to facilitate the functionality presented herein. The processing system 902 may be constructed from any number of transistors or other discrete circuit elements, which may individually or collectively assume any number of states. More specifically, the processing system 902 may operate as a finite-state machine, in response to executable instructions contained within the software modules disclosed herein. These computer-executable instructions may transform the processing system 902 by specifying how the processing system 902 transition between states, thereby transforming the transistors or other discrete hardware elements constituting the processing system 902.

The disclosure presented herein also encompasses the subject matter set forth in the following clauses.

Example Clause A, a method comprising: generating a tenant-specific model for a latency signal by analyzing a training dataset for a tenant over a training time period, wherein: the training dataset includes respective percentile latency values, per a defined time bin, for each percentile in a defined set of percentiles; the respective latency values are associated with a service offered by a cloud provider; the tenant-specific model defines a distribution based on a mean and a standard deviation of the respective percentile latency values for each percentile in the defined set of percentiles; accessing current percentile latency values associated with the tenant for a current time bin, wherein the current percentile latency values are respectively associated with percentiles in the defined set of percentiles; generating a latency health score vector for the tenant and for the current time bin by determining percentile health scores for each percentile in the defined set of percentiles via a comparison of a current percentile latency value to the distribution; calculating an overall latency health score based on a plurality of latency health scores in the latency health score vector; determining that the overall latency health score is less than a latency health score threshold; in response to determining that the overall latency health score is less than the latency health score threshold, designating the tenant as an unhealthy tenant due to abnormal latency; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

Example Clause B, the method of Example Clause A, wherein the latency signal and the tenant-specific model are associated with a resource deployed by the service and for the tenant within a defined geographic region of a cloud platform or a distributed computing environment.

Example Clause C, the method of Example Clause A or Example Clause B, wherein: the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows: $PHS=(1-PRS)*100$.

Example Clause D, the method of any one of Example Clauses A through C, wherein the overall latency health score is calculated based on respective weights assigned to the plurality of latency health scores in the latency health score vector.

Example Clause E, the method of Example Clause D, wherein the weights are defined by the tenant.

Example Clause F, the method of any one of Example Clauses A through E, further comprising establishing the predefined threshold number of unhealthy tenants by: calculating an average number of unhealthy tenants across time bins in a defined number N of days; calculating a standard deviation associated with the average number of unhealthy tenants; and setting the predefined threshold number of unhealthy tenants to be a predefined number of standard deviations above the average number of unhealthy tenants.

Example Clause G, the method of any one of Example Clauses A through F, wherein the notification comprises information that indicates an impacted geographic region, a detection time, and a percentage of tenants impacted.

Example Clause H, a system comprising: a processing system; and a computer-readable medium storing instructions that, when executed by the processing system, cause the system to perform operations comprising: generating a tenant-specific model for a latency signal by analyzing a training dataset for a tenant over a training time period, wherein: the training dataset includes respective percentile latency values, per a defined time bin, for each percentile in a defined set of percentiles; the respective latency values are associated with a service offered by a cloud provider; the tenant-specific model defines a distribution based on a mean and a standard deviation of the respective percentile latency values for each percentile in the defined set of percentiles; accessing current percentile latency values associated with the tenant for a current time bin, wherein the current percentile latency values are respectively associated with percentiles in the defined set of percentiles; generating a latency health score vector for the tenant and for the current time bin by determining percentile health scores for each percentile in the defined set of percentiles via a comparison of a current percentile latency value to the distribution; calculating an overall latency health score based on a plurality of latency health scores in the latency health score vector; determining that the overall latency health score is less than a latency health score threshold; in response to determining that the overall latency health score is less than the latency health score threshold, designating the tenant as an unhealthy tenant due to abnormal latency; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

Example Clause I, the system of Example Clause H, wherein the latency signal and the tenant-specific model are associated with a resource deployed by the service and for the tenant within a defined geographic region of a cloud platform or a distributed computing environment.

Example Clause J, the system of Example Clause H or Example Clause I, wherein: the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows: PHS=(1−PRS)*100.

Example Clause K, the system of any one of Example Clauses H through J, wherein the overall latency health score is calculated based on respective weights assigned to the plurality of latency health scores in the latency health score vector.

Example Clause L, the system of Example Clause K, wherein the weights are defined by the tenant.

Example Clause M, the system of any one of Example Clauses H through L, wherein the operations further comprise establishing the predefined threshold number of unhealthy tenants by: calculating an average number of unhealthy tenants across time bins in a defined number N of days; calculating a standard deviation associated with the average number of unhealthy tenants; and setting the predefined threshold number of unhealthy tenants to be a predefined number of standard deviations above the average number of unhealthy tenants.

Example Clause N, the system of any one of Example Clauses H through M, wherein the notification comprises information that indicates an impacted geographic region, a detection time, and a percentage of tenants impacted.

Example Clause O, a computer-readable storage medium storing instructions that, when executed by a processing system, cause a system to perform operations comprising: generating a tenant-specific model for a latency signal by analyzing a training dataset for a tenant over a training time period, wherein: the training dataset includes respective percentile latency values, per a defined time bin, for each percentile in a defined set of percentiles; the respective latency values are associated with a service offered by a cloud provider; the tenant-specific model defines a distribution based on a mean and a standard deviation of the respective percentile latency values for each percentile in the defined set of percentiles; accessing current percentile latency values associated with the tenant for a current time bin, wherein the current percentile latency values are respectively associated with percentiles in the defined set of percentiles; generating a latency health score vector for the tenant and for the current time bin by determining percentile health scores for each percentile in the defined set of percentiles via a comparison of a current percentile latency value to the distribution; calculating an overall latency health score based on a plurality of latency health scores in the latency health score vector; determining that the overall latency health score is less than a latency health score threshold; in response to determining that the overall latency health score is less than the latency health score threshold, designating the tenant as an unhealthy tenant due to abnormal latency; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

Example Clause P, the computer-readable storage medium of Example Clause O, wherein the latency signal and the tenant-specific model are associated with a resource deployed by the service and for the tenant within a defined geographic region of a cloud platform or a distributed computing environment.

Example Clause Q, the computer-readable storage medium of Example Clause O or Example Clause P, wherein: the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows: PHS=(1−PRS)*100.

Example Clause R, the computer-readable storage medium of any one of Example Clauses O through Q, wherein: the overall latency health score is calculated based on respective weights assigned to the plurality of latency health scores in the latency health score vector; and the weights are defined by the tenant.

Example Clause S, the computer-readable storage medium of any one of Example Clauses O through R, wherein the operations further comprise establishing the predefined threshold number of unhealthy tenants by: calculating an average number of unhealthy tenants across time bins in a defined number N of days; calculating a standard deviation associated with the average number of unhealthy tenants; and setting the predefined threshold number of unhealthy tenants to be a predefined number of standard deviations above the average number of unhealthy tenants.

Example Clause T, the computer-readable storage medium of any one of Example Clauses O through S, wherein the notification comprises information that indicates an impacted geographic region, a detection time, and a percentage of tenants impacted.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:

generating a tenant-specific model for a latency signal by analyzing a training dataset for a tenant over a training time period, wherein:

the training dataset includes respective percentile latency values, per a defined time bin, for each percentile in a defined set of percentiles;

the respective latency values are associated with a service offered by a cloud provider;

the tenant-specific model defines a distribution based on a mean and a standard deviation of the respective percentile latency values for each percentile in the defined set of percentiles;

accessing current percentile latency values associated with the tenant for a current time bin, wherein the current percentile latency values are respectively associated with percentiles in the defined set of percentiles;

generating a latency health score vector for the tenant and for the current time bin by determining percentile health scores for each percentile in the defined set of percentiles via a comparison of a current percentile latency value to the distribution;

calculating an overall latency health score based on a plurality of latency health scores in the latency health score vector;

determining that the overall latency health score is less than a latency health score threshold;

in response to determining that the overall latency health score is less than the latency health score threshold, designating the tenant as an unhealthy tenant due to abnormal latency;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

2. The method of claim 1, wherein the latency signal and the tenant-specific model are associated with a resource deployed by the service and for the tenant within a defined geographic region of a cloud platform or a distributed computing environment.

3. The method of claim 1, wherein:

the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows:

$$PHS = (1 - PRS) * 100.$$

4. The method of claim 1, wherein the overall latency health score is calculated based on respective weights assigned to the plurality of latency health scores in the latency health score vector.

5. The method of claim 4, wherein the weights are defined by the tenant.

6. The method of claim 1, further comprising establishing the predefined threshold number of unhealthy tenants by:

calculating an average number of unhealthy tenants across time bins in a defined number N of days;

calculating a standard deviation associated with the average number of unhealthy tenants; and setting the predefined threshold number of unhealthy tenants to be a predefined number of standard deviations above the average number of unhealthy tenants.

7. The method of claim 1, wherein the notification comprises information that indicates an impacted geographic region, a detection time, and a percentage of tenants impacted.

8. A system comprising:

a processing system; and a computer-readable medium storing instructions that, when executed by the processing system, cause the system to perform operations comprising:

generating a tenant-specific model for a latency signal by analyzing a training dataset for a tenant over a training time period, wherein:

the training dataset includes respective percentile latency values, per a defined time bin, for each percentile in a defined set of percentiles;

the respective latency values are associated with a service offered by a cloud provider;

the tenant-specific model defines a distribution based on a mean and a standard deviation of the respective percentile latency values for each percentile in the defined set of percentiles;

accessing current percentile latency values associated with the tenant for a current time bin, wherein the current percentile latency values are respectively associated with percentiles in the defined set of percentiles;

generating a latency health score vector for the tenant and for the current time bin by determining percentile health scores for each percentile in the defined set of percentiles via a comparison of a current percentile latency value to the distribution;

calculating an overall latency health score based on a plurality of latency health scores in the latency health score vector;

determining that the overall latency health score is less than a latency health score threshold;

in response to determining that the overall latency health score is less than the latency health score threshold, designating the tenant as an unhealthy tenant due to abnormal latency;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

9. The system of claim 8, wherein the latency signal and the tenant-specific model are associated with a resource deployed by the service and for the tenant within a defined geographic region of a cloud platform or a distributed computing environment.

10. The system of claim 8, wherein:

the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows:

$$PHS = (1 - PRS) * 100.$$

11. The system of claim 8, wherein the overall latency health score is calculated based on respective weights assigned to the plurality of latency health scores in the latency health score vector.

12. The system of claim 11, wherein the weights are defined by the tenant.

13. The system of claim 8, wherein the operations further comprise establishing the predefined threshold number of unhealthy tenants by:

calculating an average number of unhealthy tenants across time bins in a defined number N of days;

calculating a standard deviation associated with the average number of unhealthy tenants; and setting the predefined threshold number of unhealthy tenants to be a predefined number of standard deviations above the average number of unhealthy tenants.

14. The system of claim 8, wherein the notification comprises information that indicates an impacted geographic region, a detection time, and a percentage of tenants impacted.

15. A non-transitory computer-readable storage medium storing instructions that, when executed by a processing system, cause a system to perform operations comprising:

generating a tenant-specific model for a latency signal by analyzing a training dataset for a tenant over a training time period, wherein:

the training dataset includes respective percentile latency values, per a defined time bin, for each percentile in a defined set of percentiles;

the respective latency values are associated with a service offered by a cloud provider;

the tenant-specific model defines a distribution based on a mean and a standard deviation of the respective percentile latency values for each percentile in the defined set of percentiles;

accessing current percentile latency values associated with the tenant for a current time bin, wherein the current percentile latency values are respectively associated with percentiles in the defined set of percentiles;

generating a latency health score vector for the tenant and for the current time bin by determining percentile health scores for each percentile in the defined set of percentiles via a comparison of a current percentile latency value to the distribution;

calculating an overall latency health score based on a plurality of latency health scores in the latency health score vector;

determining that the overall latency health score is less than a latency health score threshold;

in response to determining that the overall latency health score is less than the latency health score threshold, designating the tenant as an unhealthy tenant due to abnormal latency;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential latency issue associated with the service.

16. The non-transitory computer-readable storage medium of claim 15, wherein the latency signal and the tenant-specific model are associated with a resource deployed by the service and for the tenant within a defined geographic region of a cloud platform or a distributed computing environment.

17. The non-transitory computer-readable storage medium of claim 15, wherein:

the comparison of the current percentile latency value to the distribution comprises determining a percentile rank score (PRS) for the current percentile latency value using a z-score and a z-table; and the percentile health score (PHS) for a corresponding percentile in the defined set of percentiles is a percentage calculated as follows:

$$PHS = (1 - PRS) * 100.$$

18. The non-transitory The computer-readable storage medium of claim 15, wherein:

the overall latency health score is calculated based on respective weights assigned to the plurality of latency health scores in the latency health score vector; and the weights are defined by the tenant.

19. The non-transitory computer-readable storage medium of claim 15, wherein the operations further comprise establishing the predefined threshold number of unhealthy tenants by:

calculating an average number of unhealthy tenants across time bins in a defined number N of days;

calculating a standard deviation associated with the average number of unhealthy tenants; and setting the predefined threshold number of unhealthy tenants to be a predefined number of standard deviations above the average number of unhealthy tenants.

20. The non-transitory computer-readable storage medium of claim 15, wherein the notification comprises information that indicates an impacted geographic region, a detection time, and a percentage of tenants impacted.

\* \* \* \* \*